3,494,771
EMULSIFIER COMPOSITION FOR CAKES AND METHOD OF PREPARING CAKES UTILIZING THE SAME

John B. Thompson, Rochester, N.Y., assignor to Eastman Kodak Company, Rochester, N.Y., a corporation of New Jersey
No Drawing. Filed Mar. 19, 1965, Ser. No. 441,325
Int. Cl. A21d 13/08
U.S. Cl. 99—92                                9 Claims

ABSTRACT OF THE DISCLOSURE

Baking cake from a batter to which has been added as an emulsifier a dispersion consisting essentially of (1) a conjointly solidified mixture of propylene glycol monostearate and a monoglyceride, (2) stearyl lactylic acid, and (3) water. The inventive concept includes the dispersion mixture, cake batter containing same, cake made from the batter, a process for making the dispersion mixture, and a process for making cake batter.

---

This invention relates to food. More particularly, it relates to cakes and cake batter.

Currently, in the baking industry there is a trend towards oil (normally liquid triglyceride material) in place of fat (normally solid triglyceride material). Reasons for this include ease of handling, labor savings, plant automation and more tender baked goods. In addition, some medical authorities recommend unsaturated triglycerides, which are normally liquid, in place of normally solid, at least partially saturated, triglycerides in order to decrease blood cholesterol.

However, replacement of fat in cake batters with oil causes loss of gas from the batter during mixing. This results in cake of low volume and power texture. Consequently, in the replacement of the fat in cake batters with oil, it is necessary to employ one or more emulsifiers.

Food emulsifiers can be added directly to the other ingredients of cake batter at the time of preparing the cake batter. However, under such conditions it is difficult to disperse the emulsifiers to the desired extent in cake batters.

Food emulsifiers can be incorporated into oil prior to preparing the cake batter. A clear product, however, is difficult to obtain at the emulsifier levels which are considered desirable or necessary for cakes of high volume and good texture. So-called liquid shortenings (oil plus emulsifiers) either have the emulsifiers at too low a level or else contain the emulsifiers in a precipitated condition. Another problem is the fact that premixed oil and emulsifiers when stored are usually subject to temperature changes which bring about precipitation of part or all of the emulsifier contents.

Consequently, there exists the problem of providing an emulsifier composition which can be readily incorporated into cake batters and the like based on normally liquid triglyceride material.

This invention is based upon the discovery that a dispersion consisting essentially of (A) a mixture consisting essentially of two known food emulsifiers, namely, conjoined crystal material and acyl lactylic acid material at a weight ratio within a certain range, and (B) water at a concentration within a particular range is an emulsifier composition which is eminently suitable for cake batters based on normally solid triglyceride material and those based on oil as well as those which do not require triglyceride shortening, and which has many beneficial and advantageous properties, an important one of which is excellent water dispersibility.

In summary this invention comprises as a composition of matter a mixture consisting essentially of conjoined crystal material and acyl lactylic acid material at a weight ratio of said conjoined crystal material to said acyl lactylic acid material in a range from about 1:1 to about 9:1 and preferably about 5–7:1.

This invention also comprises as a composition of matter a dispersion consisting essentially of (A) said mixture and (B) water at a concentration generally in a range from about 50 to about 85% by weight of said dispersion and preferably in a range from about 60 to about 80% by weight of said dispersion. In this preferred range the dispersion varies from a thick fluid to a stiff paste and from a smooth to a slightly grainy texture. Usually, a weight ratio and a water concentration within the ranges indicated is selected to give a soft, usually pourable product.

In addition this invention comprises cake batters and cakes with an emulsifier composition that consists essentially of said mixture. In preferred embodiments of cake batters said emulsifier composition consists essentially of said dispersion. The concentration of said mixture in said cake batters and cakes depends on the type of cake involved. However, in general the concentration of said mixture is in a range from about 0.1 to about 11% by weight of the flour content of the cake.

Conjoined crystal material is disclosed in the U.S. Patent, No. 3,034,898, to Noel H. Kuhrt et al. It consists essentially of concurrently solidified fatty acid monoesters, 35 to 60 mole percent of said monoesters being monoesters of glycerol with a substantial proportion of said monoesters of glycerol being in a normally unstable polymorphic form, and 40–65 mole percent of said monoesters being monoesters of 1,2-propanediol the fatty acid moieties of said monoesters of glycerol and 1,2-propanediol consisting essentially of saturated fatty acid having 16–20 carbon atoms with at least about 75 mole percent of the fatty acid moieties of said monoesters of glycerol being the same as the fatty acid moieties of said monoesters of 1,2-propanediol, and less than about 5 mole percent of said fatty acid moieties being unsaturated. An example of conjoined crystal material is a product marketed as Myvatex Food Emulsifier Type 3–50. This product consists essentially of a conjointly solidified mixture consisting essentially of distilled, propylene glycol monostearate material and distilled monoglyceride material. The distilled, propylene glycol monostearate material is present in the product at a concentration of about 58% of the product and has a propylene glycol monoester content of about 95% by weight of the material and a glyceryl monoester content of about 5% by weight of the propylene glycol monostearate material. The distilled monoglycerides material is present in the product at a concentration of about 42% by weight of the product and has a glyceryl monoester content of about 95% with the glyceryl monoester content having the fatty acid moieties of hydrogenated soybean oil at substantially the same relative concentration as in hydrogenated soybean oil. Also included in the product as a preservative of the metal deactivator type is citric acid at a concentration of about 0.02% by weight of the product.

The acyl lactylic acid material consits essentially of an acyl lactylic acid. This is a compound which is formed by condensing lactic acid under self-esterification conditions and the resulting condensate is reacted with a $C_{16}$–$C_{24}$ acyl chloride. The condensation of lactic acid under one set of self esterification conditions is disclosed in the U.S. Patent, No. 2,789,992, to Jerome B. Thompson et al. The condensation of lactic acid under another set of self esterification conditions is described in the U.S. Patent, No. 3,141,030, to Bruce D. Buddemeyer et al. The acyl lactylic acid material of this invention encompasses the acyl lactylic acid products of the Thompson et al. patent and of the Buddemeyer et al. patent. These products are mixtures which are represented by the generic formulas disclosed in those patents. With those formulas in mind the acyl lactylic acid material of this invention is represented by the formula:

$$RCO(OCHCH_3CO)_nOH$$

wherein RCO is a member selected from the group consisting of acyl radicals of fatty acids containing 16–24 carbon atoms, and mixtures thereof, and $n$ is a number representing the average number of lactyl ($OCHCH_3CO$) groups present per molecule of the composition, the value of $n$ being in a range from about 0.3 to about 9. Examples of acyl lactylic acid materials include stearyl lactylic acid products wherein $n$ is 2–4.

The basic mixture of this invention is preferably made by admixing the components at least in a finely divided condition and preferably in an aqueous dispersion. However, melting the components together to form a molten blend and then spray chilling the molten blend will give a useful beadlet product.

In addition to the basic components of the mixture and of the dispersion of this invention, minor concentrations of other materials, for example, preservatives such as antioxidants, metal deactivators, mold inhibitors and the like can be present under the concepts of this invention.

The aqueous dispersion of this invention is made by admixing the components while establishing and maintaining the temperature of the water in a range from about 150 to about 212° F., whereby a dispersion of the mixture and water is formed, and then cooling with stirring the dispersion of a temperature below about 120° F. In an alternate embodiment of this invention the admixing step is performed by admixing the solid components in beadlet form to water while heating and stirring.

The cake batter of this invention is made by admixing, preferably in one step, the components at 20–25° C. In preferred embodiments of this invention the dispersion of this invention is employed and a triglyceride material that is normaly liquid is used.

Normally liquid triglyceride material consists essentially of at least one edible triglyceride which at 20–25° C. is normally liquid. It includes mixtures of normally liquid triglycerides. Examples of normally liquid triglyceride material are: cottonseed oil, corn oil, soybean oil, safflower oil, peanut oil, rapeseed oil, sesame seed oil, sunflower seed oil, normally liquid fractions of palm oil, lard and tallow, and the like. The normally liquid triglyceride mateiral need not be derived from a natural source but can comprise an edible triglyceride oil which has been synthesized. Moreover, the normally liquid triglyceride material can be a clear, normally liquid blend of two or more mixtures of edible triglycerides at least one of which is normally liquid with the normally liquid triglyceride content of the blend being at a sufficient concentration to dissolve the normally solid triglyceride content.

This invention is further illustrated by the following examples of various aspects thereof including specific embodiments. Unless otherwise indicated, this invention is not limited to these specific embodiments. As used in these examples parts by weight means the same as units of weight with the unit of weight in each formulation and receipe being the same for each component and ingredient, respectively.

EXAMPLE 1

This example illustrates a specific embodiment of the emulsifier composition of this invention.

The formulation of this specific embodiment is:

| Components: | Parts by weight |
|---|---|
| Myvatex Food Emulsifier Type 3–50 | 25 |
| Stearyl (2) lactylic acid | 5 |
| Water | 70 |

This specific embodiment is made by admixing the components at a temperature of 200° F. and then pouring the resulting mixture into a mixer such as a Hobart mixer bowl equipped with a wire whip. The mixture in the mixer is stirred (in the case of the Hobart mixer with a wire whip at speed setting No. 1) until the temperautre drops to 120° F. The result is typically a paste which is slightly grainy and soft.

This specific embodiment is useful as a food emulsifier in the preparation of cake batters and the like.

EXAMPLE 2

This example illustrates another specific embodiment of the emulsifier composition of this invention.

The formulation of this specific embodiment is:

| Components: | Parts by weight |
|---|---|
| Myvatex Food Emulsifier Type 3–50 | 35 |
| Stearyl (2) lactylic acid | 5 |
| Water | 60 |

This specific embodiment is made by heating together the components to 150° F. in a container over a steam bath while agitating with a stirrer. The container is removed from the steam bath and stirring is continued until the temperautre drops to 120° F. The result is a dispersion which at 20–25° C. appears as a slightly grainy, soft paste.

This specific composition is useful as a food emulsifier in cake batters and the like.

EXAMPLE 3

This example illustrates another specific embodiment of the emulsifier composition of this invention.

The formulation of this specific embodiment is:

| Components: | Parts by weight |
|---|---|
| Myvatex Food Emulsifier Type 3–50 | 35 |
| Stearyl (2) lactylic acid | 5 |
| Sodium propionate | 0.1 |
| Water | 59.9 |

The sodium propionate is present in this formulation as a mold inhibitor.

The specific embodiment of the paste composition of this formulation is made by heating together the components to 150° F. in a container over a steam bath while agitating with a stirrer. The container is removed from the steam bath and stirring is continued until the temperature drops to 120° F. The result is a dispersion which at 20–25° C. is a smooth appearing, soft paste.

This specific composition is useful as a food emulsifier in cake batters and the like.

The specific composition of this example typically has good cake batter emulsifying activity after three months storage without evidence of mold or spoilage.

EXAMPLE 4

This example illustrates another specific embodiment of the emulsifier composition of this invention.
The formulation of this specific embodiment is:

| Components: | Parts by weight |
|---|---|
| Myvatex Food Emulsifier Type 3–50 | 7 |
| Stearyl lactylic acid | 1 |

This specific embodiment is made by admixing the components at 68–71° C., whereby a molten blend is formed, and then spray-chilling the blend. The result is a beadlet product. This product is useful, particularly when dispersed in water at a weight ratio of said product to water in a range from about 3:7 to about 2:3, as a food emulsifier in cake batters and the like.

EXAMPLE 5

This example illustrates another specific embodiment of the emulsifier composition of this invention.
The formulation of this specific embodiment is:

| Components: | Parts by weight |
|---|---|
| Beadlet product of Ex. 4 | 40 |
| Potassium sorbate | 0.1 |
| Water | 59.9 |

The potassium sorbate is present in this formulation as a mold inhibitor.

This specific embodiment is made by admixing the components at 160° F. The resulting dispersion at 160° F. is introduced into the "A" unit of a Votator machine and passed from the "A" unit into a "B" unit from whence it is removed at a temperature in a range from about 105 to about 115° F. The result is a dispersion which typically is a smooth, soft, white cream.

This specific embodiment is useful as a food emulsifier in cake batters and the like.

EXAMPLE 6

This example illustrates a specific embodiment of a yellow cake (120% sugar) and batter therefor according to this invention.
The recipe is as follows:

| Ingredients | Percent by wt. of flour | Parts by wt |
|---|---|---|
| Cake flour | 100 | 200 |
| Granulated sugar | 120 | 240 |
| Milk powder | 12.5 | 25 |
| Salt | 3 | 6 |
| Baking powder | 6 | 12 |
| Salad oil (wintered cottonseed oil) | 35 | 70 |
| Water | 110 | 220 |
| Whole eggs | 50 | 100 |
| Vanilla | 1 | 2 |
| Emulsifier composition of Ex. 2 | 3.5 | 7 |

The liquid ingredients (salad oil, water, emulsifier composition, eggs and vanilla) are mixed together with a spoon or spatula and poured onto the solid ingredients. The liquid and solid ingredients are then mixed together with a Hobart mixer with a wire whip at No. 1 speed for ½ minute and then for 3 minutes at No. 2 speed. The result is a good, smooth batter, a typical density of which is 0.62.

The batter is placed into one or more baking tins, a suitable quantity being approximately 300 grams of batter for each 8 inch baking tin. The tin or tins, as the case may be, are placed into an oven and baked for 24 minutes at 350° F. The resulting cake or cakes is or are moist and fine grained. A typical porosity rating is 4 and a typical volume is 1830 milliliters per pound.

EXAMPLE 7

This example illustrates a specific embodiment of a white cake (120% sugar) and batter therefor according to this invention.
The recipe of this embodiment is as follows:

| Ingredients | Percent by wt. of flour | Parts by wt. |
|---|---|---|
| Cake flour | 100 | 200 |
| Salt | 3 | 6 |
| Baking powder | 6.5 | 13 |
| Sugar | 120 | 240 |
| Powdered milk | 12.5 | 25 |
| Salad oil (wintered cottonseed oil) | 17.5 | 35 |
| Water | 100 | 200 |
| Egg whites | 50 | 100 |
| Vanilla | 1 | 2 |
| Emulsifier composition of Ex. 1 | 3.5 | 7 |

The liquid ingredients (salad oil, water, egg whites, vanilla, and emulsifier composition are mixed together and added to the solid ingredients in a mixing bowl. The liquid and solid ingredients are then mixed together with a Hobart mixer equipped with a wire whip at No. 1 speed for ½ minute and then at No. 2 speed for 3 minutes. The result is a good smooth batter, with a typical density of which is 0.68.

The batter is placed in one or more baking tins, the quantity being 300 grams of batter per 8 inch layer tin, and then baked in an oven at 350° F. for 23 minutes. The result is cake which typically is fine grained and moist. A typical porosity of the cake is 3 and a typical volume is 1475 milliliters per pound.

EXAMPLE 8

This example illustrates a specific embodiment of a chocolate cake (120% sugar) and batter therefor according to this invention.
The recipe of this specific embodiment is:

| Ingredients | Percent by wt. of flour | Parts by wt. |
|---|---|---|
| Cake flour | 100 | 200 |
| Granulated sugar | 120 | 240 |
| Cocoa (D.P.) | 25 | 50 |
| Salt | 3 | 6 |
| Baking powder | 5 | 10 |
| Baking soda | 1.25 | 2.5 |
| Milk powder | 10 | 20 |
| Salad oil (wintered cottonseed oil) | 35 | 70 |
| Water | 120 | 240 |
| Whole eggs | 50 | 100 |
| Emulsifier composition of Ex. 2 | 3.0 | 6 |

The cake batter is made by mixing together the liquid ingredients (salad oil, water, whole eggs and emulsifier composition) and then pouring the mixed liquid ingredients onto the solid ingredients in a mixing bowl. The liquid and solid ingredients are mixed together with a Hobart mixer with a wire whip at No. 1 speed for ½ minute and then at No. 2 speed for 3 minutes. The resulting batter is smooth and good. A typical density of the batter is 0.70.

The batter is poured into one or more baking tins, the quantity being 300 grams per 8 inch baking tin. The tin or tins is or are placed into a 350° F. oven and held at this temperature for 24 minutes. The result is chocolate cake which is moist and fine grained. A typical porosity of the cake is 3 and a typical volume is 1729 milliliters per pound.

EXAMPLE 9

This example illustrates a specific embodiment of a pound cake and batter therefor according to this invention.

The recipe of this embodiment is:

| Ingredients | Percent by wt. of flour | Parts by wt. |
| --- | --- | --- |
| Cake flour | 100 | 370 |
| Powdered milk | 7 | 26 |
| Sugar | 109 | 402 |
| Salt | 3.5 | 13 |
| Salad oil (wintered cottonseed oil) | 55 | 204 |
| Whole eggs | 55 | 204 |
| Water | 45 | 164 |
| Emulsifier composition of Ex. 1 | 6.5 | 27 |

The liquid ingredients (salad oil, whole eggs, water and emulsifier composition) are mixed together and then added to the solid ingredients in a mixing bowl. The ingredients are mixed together with a Hobart mixer with a wire whip at No. 1 speed for ½ minute and then at No. 2 speed for 3 minutes. The result is a smooth and good batter, a typical density of which is 0.70.

The batter is poured into one or more baking tins, the quantity being 510 grams per one pound loaf tin. The tin or tins containing the batter is or are placed into an oven at 350° F. and baked at this temperature for 56 minutes. The cake thus obtained typically has a low density and high volume. A typical cake volume is 1400 milliliters per pound and a typical porosity is 3.

EXAMPLE 10

This example illustrates a specific embodiment of a chiffon cake and batter therefor according to this invention.

The recipe of this specific embodiment is:

| Ingredients | Percent by wt. of flour | Parts by wt. |
| --- | --- | --- |
| Cake flour | 100 | 190 |
| Baking powder | 5.3 | 10 |
| Salt | 2.4 | 4.6 |
| Granulated sugar | 137 | 260 |
| Cream of tartar | 0.95 | 1.8 |
| Water | 77 | 147 |
| Salad oil (wintered cottonseed oil) | 53 | 100 |
| Egg yolks | 53 | 100 |
| Emulsifier composition of Ex. 2 | 5 | 9.5 |
| Egg white | 103 | 196 |

The batter is prepared by mixing together the liquid ingredients (water, salad oil, egg yolks and emulsifier composition) and then adding the mixed liquid ingredients to the solid ingredients in a mixing bowl. The ingredients are then stirred with a Hobart mixer with a wire whip at No. 1 speed for ½ minute and at No. 2 speed for 3 minutes. The egg whites are whipped until stiff and then folded into the mixture. The resulting batter is typically smooth, thick and of a low density. A typical density is 0.30.

The batter is then poured into one or more baking tins, the quantity being 400 grams per angel food loaf tin or 340 grams per 8 inch layer tin. The tin or tins, as the case may be, is or are then placed into an oven at a temperature of 350° F. for 23 minutes. The resulting cake is of good texture, low density and high volume. A typical porosity is 3 and a typical volume is 1920 milliliters per pound.

EXAMPLE 11

This example illustrates a specific embodiment of a sponge cake (140% sugar) and batter therefor according to this invention.

The recipe of this embodiment is:

| Ingredients | Percent by wt. of flour | Parts by wt. |
| --- | --- | --- |
| Cake flour | 100 | 200 |
| Milk powder | 10.5 | 21 |
| Sugar | 143 | 286 |
| Salt | 1 | 2 |
| Baking powder | 1 | 2 |
| Whole eggs | 143 | 286 |
| Water | 43 | 86 |
| Emulsifier composition of Ex. 1 | 5 | 10 |

The solid ingredients (cake flour, milk powder, sugar, salt and baking powder) are added to a mixing bowl followed by the liquid ingredients (whole eggs, water and emulsifier composition). The solid and liquid ingredients are then mixed together in the mixing bowl with a Hobart mixer at No. 1 speed for ½ minute and then at No. 2 speed for 4 minutes. The batter thus obtained is typically very smooth, slightly thick and of low density. A typical density is 0.30.

The batter is then placed into one or more tins, the quantity being 200 grams per 8 inch layer tin. The tin or tins, as the case may be, is or are placed in an oven at a temperature of 350° F. and baked for 17 minutes. The cake thus obtained typically has a very fine, silky texture, a typical volume being 2022 milliliters per pound and a typical porosity being 4.

This sponge cake batter is also useful in the making of swiss roll or jelly roll. The batter when baked in a sheet pan produces cake that can be rolled nicely, without cracking, into a jelly roll or the like.

EXAMPLE 12

This example illustrates the utility of the emulsifier composition of this invention in a yellow cake (120% sugar) and batter therefor, wherein normally solid triglyceride material is used instead of normally liquid triglyceride material.

The recipe of this formulation is:

| Ingredients | Percent by wt. of flour | Parts by wt. |
| --- | --- | --- |
| Cake flour | 100 | 200 |
| Granulated sugar | 120 | 240 |
| Milk powder | 12.5 | 25 |
| Salt | 3 | 6 |
| Baking powder | 6 | 12 |
| Plastic shortening (normally solid triglyceride material) | 35 | 70 |
| Emulsifier composition of Ex. 3 | 3.5 | 7 |
| Water | 110 | 220 |
| Whole eggs | 50 | 100 |
| Vanilla | 1 | 2 |

The batter is prepared by creaming together the plastic shortening, emulsifier composition, sugar and flour for 3 minutes. The remaining liquid ingredients are then added and mixing continued with a wire whip of a Hobart mixer at No. 1 speed for ½ minute. Then the batter is mixed at No. 2 speed for 3 more minutes. The batter thus obtained is smooth and typically slightly stiff. A typical density is 0.80.

The batter is then placed into one or more baking tins, the quantity being approximately 300 grams per 8 inch baking tin, and baked for 24 minutes at 350° F. The cake thus obtained typically has high volume and porosity, a typical cake volume being 1442 milliliters per pound and a typical porosity being 3.

The batter can also be made by stirring together the plastic shortening, emulsifier composition and other liquid ingredients and then adding the resulting mixture to the solid ingredients in a mixer bowl. The contents of the bowl are then stirred with a Hobart mixer with a wire whip at No. 1 speed for a period of 8 minutes. The batter thus obtained is typically smooth and thick, a typical density being 0.80. Again the batter is poured out into one or more baking tins, a typical quantity being 300 grams for each 8 inch baking tin, and baked 24 minutes at 350° F. A typical cake volume of the cake thus made is 1416 milliliters per pound and a typical porosity is 3.

Hence, the emulsifier composition is useful not only in cake batters and cakes based on normally liquid triglyceride material, but also in cake batters and cakes based on normally solid triglyceride material.

EXAMPLE 13

This example illustrates another specific embodiment of a yellow cake (120% sugar) and batter therefor according to this invention.

The recipe of this specific embodiment is the same as that given in Example 6 except that the emulsifier composition is that of Example 5 and the emulsifier composition is employed at a concentration of 3% by weight of the flour or at 6 parts by weight.

The procedure for making the cake batter preparation is the same as in Example 6. A typical batter thus obtained appears smooth-good and has a density of 0.75.

The cake baking procedure is the same as in Example 6. The cake thus obtained has good eating quality. A typical volume is 1550 milliliters per pound and a typical porosity rating is 3.

EXAMPLE 14

This example illustrates another specific embodiment of a chocolate cake (120% sugar) and batter therefor according to this invention.

The recipe of this specific embodiment is the same as that of Example 8 except that the emulsifier composition is that of Example 5.

The batter for this embodiment is prepared by the same procedure as in the case of Example 8. The batter thus obtained typically is good and smooth. A typical density of the batter is 0.75.

The cake is made from the batter by the procedure described in Example 8. As thus made it is of good eating quality. A typical cake volume is 1556 milliliters per pound of cake and a typical porosity rating is 3.

EXAMPLE 15

This example illustrates another specific embodiment of a pound cake and batter according to this invention.

The recipe of this specific embodiment is the same as the one of Example 9 except that the emulsifier composition is that of Example 5 and the emulsifier composition concentration is 4% by weight of the flour or 14.8 parts by weight.

The batter for this embodiment is prepared by the same procedure as presented in Example 9. The batter which results typically is smooth and thick with a density of 0.60.

The cake is made by the same procedure as disclosed in Example 9. The cake thus made typically has a very fine grain. A typical cake volume is 1479 milliliters per pound and a typical porosity rating is 4.

EXAMPLE 16

This example illustrates another specific embodiment of a sponge cake and batter of this invention.

The recipe for this embodiment is the same as that of Example 11 except that the emulsifier composition which it calls for is the Example 5 emulsifier composition and its concentration is 4.5% of the flour or 9 parts by weight.

The batter is made by the batter making procedure described in Example 11. The batter which results is typically thick and smooth, a typical density being 0.45.

The cake is made from the batter by the cake baking procedure of Example 11. The resulting cake typically has a very fine texture and good volume. A typical volume is 2200 milliliters per pound and a typical porosity is 4.

Thus, this invention provides an emulsifier composition offering a number of advantages. In this connection, most of the recipes given in the foregoing examples are standard recipes modified so as to call for the dispersion of this invention. However, the scaling weights (for example: quantity of batter per 8 inch cake tin) of the batters under this invention can be as much as 15% less than the scaling weight of the batters obtained under the unmodified, standard recipes and still have cakes of excellent volume and texture. Another feature of advantage is that one-step mixing of ingredients now becomes practical. Heretofore, one-step mixing has resulted in inferior baked goods. Indeed, chocolate cake, chiffon cake and sponge cake do not appear to have ever been prepared satisfactorily by one-step mixing. The emulsifier composition of this invention permits one-step mixing of the ingredients in these cakes with no adverse effect on the finished cake. Moreover, mixing time can be reduced by as much as ⅔ of the usual time required or, using the normal mixing time, good cakes can be produced with lower and thus more economical levels of emulsifier.

Other features, advantages and specific embodiments of this invention will be readily apparent to those in the exercise of ordinary skill in the art after reading the foregoing disclosures. In this regard, while this invention has been described in considerable detail relative to specific embodiments thereof, variations and modifications of these embodiments can be effected without departing from the spirit and scope of the invention as disclosed.

I claim:

1. A dispersion consisting essentially of (A) a mixture consisting essentially of (1) a conjointly solidified mixture consisting essentially of propylene glycol monoester of fatty acids having 16–20 carbon atoms and monoglyceride of fatty acid having 16–20 carbon atoms, said propylene glycol monoester being at a concentration of 40–65 mole percent of said conjointly solidified mixture and said monoglyceride being at a concentration of 35–60 mole percent of said conjointly solidified mixture, and (2) acyl lactylic acid wherein the acyl radical is of a fatty acid having 16–24 carbon atoms, the weight ratio of said conjointly solidified mixture to said acyl lactylic acid being between 1 and 9 to 1 and (B) water at a concentration in a range from about 50 to about 85% by weight of said dispersion.

2. An emulsifier composition which is hydratable to have utility as an emulsifier for liquid shortening containing cakes, consisting essentially of
  (A) a concurrently solidified mixture of fatty acid monoesters, 35 to 60 mole percent of said monoesters being monoesters of glycerol with a substantial proportion of said monoesters of glycerol being in a normally unstable polymorphic form, and 40 to 65 mole percent of said monoesters being monoesters of 1,2-propanediol, the fatty acid moieties of said monoesters of glycerol and 1,2-propanediol consisting essentially of saturated fatty acid having 16–20 carbon atoms with at least about 75 mole percent of the fatty acid moieties of said monoesters of glycerol being the same as the fatty acid moieties of said monoesters of 1,2-propanediol, and less than about 5 mole percent of said fatty acid moieties being unsaturated; and
  (B) acyl lactylic acid wherein the acyl radical is of a fatty acid having 16–24 carbon atoms, the weight ratio of said concurrently solidified mixture to said acyl lactylic acid being between 1 and 9 to 1.

3. An emulsifier composition in accordance with claim 2 wherein the fatty acid moieties of said monoesters and said acyl lactylic acid are essentially all stearyl.

4. An emulsifier composition in accordance with claim 2 wherein the fatty acid moieties of said monoesters are the fatty acid moieties of hydrogenated soybean oil, and wherein said lactylic acid is stearyl lactylic acid.

5. An aqueous dispersion having utility as an emulsifier for liquid shortening containing cakes consisting essentially of the emulsifier composition of claim 2 together with water at a concentration in a range from about 50% to about 85% by weight of said dispersion.

6. An aqueous dispersion having utility as an emulsifier for liquid shortening containing cakes consisting essentially of the emulsifier composition of claim 3 together with water at a concentration in a range from about 50% to about 85% by weight of said dispersion.

7. An aqueous dispersion having utility as an emulsifier for cakes consisting essentially of the emulsifier composition of claim 4 together with water at a concentration in a range from about 50% to about 85% by weight of said dispersion.

8. A method of preparing cakes from a baking mix including flour and a normally liquid triglyceride shortening, which comprises incorporating into the baking mix prior to baking .1% to 11% by weight, based on said flour, of an aqueous dispersion in accordance with claim 5; forming a batter therefrom; and subsequently baking said batter.

9. A method of preparing cakes from a baking mix including flour and a normally liquid triglyceride shortening, which comprises incorporating into the baking mix prior to baking .1% to 11% by weight, based on said flour, of an aqueous dispersion in accordance with claim 7; forming a batter therefrom; and subsequently baking said batter.

References Cited

UNITED STATES PATENTS

| | | | |
|---|---|---|---|
| 2,744,825 | 5/1956 | Thompson et al. | 99—91 |
| 3,034,897 | 5/1962 | Kuhrt et al. | 99—91 |
| 3,180,736 | 4/1965 | Landfried | 99—91 |
| 3,244,534 | 4/1966 | Buddemeyer et al. | 99—91 |

RAYMOND N. JONES, Primary Examiner

U.S. Cl. X.R.

99—118

PO-1050
(5/69)

UNITED STATES PATENT OFFICE
CERTIFICATE OF CORRECTION

Patent No. 3,494,771    Dated February 10, 1970

Inventor(s) John B. Thompson

It is certified that error appears in the above-identified patent and that said Letters Patent are hereby corrected as shown below:

Column 1, line 38 - "power" should read -- poor --. Column 3, line 63 - "mateiral" should read --material--.

Column 6, line 25 - "composition" should read --composition)--. Column 7, lines 17, 18 - "164" should read --167--, and "27" should read --24--. Column 10 - delete claim 1. Column 11, line 10 - "for" should read --for liquid shortening containing--. In the heading to the printed specification, line 10, "9 Claims" should read -- 8 Claims --.

SIGNED AND
SEALED
JUL 28 1970

(SEAL)
Attest:

Edward M. Fletcher, Jr.
Attesting Officer

WILLIAM E. SCHUYLER, JR.
Commissioner of Patents